United States Patent
Uhm et al.

(10) Patent No.: US 12,206,070 B2
(45) Date of Patent: Jan. 21, 2025

(54) LITHIUM SECONDARY BATTERY

(71) Applicant: LG CHEM, LTD., Seoul (KR)

(72) Inventors: Insung Uhm, Daejeon (KR); Yohan Kwon, Daejeon (KR); Eunkyung Park, Daejeon (KR); Jae Hyun Lee, Daejeon (KR); Minchul Jang, Daejeon (KR); Byoungkuk Son, Daejeon (KR); Seongmin Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 625 days.

(21) Appl. No.: 17/265,400

(22) PCT Filed: Oct. 30, 2019

(86) PCT No.: PCT/KR2019/014498
§ 371 (c)(1),
(2) Date: Feb. 2, 2021

(87) PCT Pub. No.: WO2020/091428
PCT Pub. Date: May 7, 2020

(65) Prior Publication Data
US 2021/0273262 A1  Sep. 2, 2021

(30) Foreign Application Priority Data

Oct. 30, 2018 (KR) .................. 10-2018-0130620
Oct. 30, 2019 (KR) .................. 10-2019-0136866

(51) Int. Cl.
*H01M 10/0567* (2010.01)
*H01M 4/04* (2006.01)
(Continued)

(52) U.S. Cl.
CPC ..... *H01M 10/0567* (2013.01); *H01M 4/0404* (2013.01); *H01M 4/139* (2013.01);
(Continued)

(58) Field of Classification Search
None
See application file for complete search history.

(56) References Cited

U.S. PATENT DOCUMENTS 6,214,061 B1  4/2001  Visco et al.
6,255,020 B1  7/2001  Yamashita et al.
(Continued)

FOREIGN PATENT DOCUMENTS

CN  107068972 A  8/2017
CN  108550859 A  9/2018
(Continued)

OTHER PUBLICATIONS

Devaraj Shanmukaraj, Sylvie Grugeon, Stéphane Laruelle, Gregory Douglade, Jean-Marie Tarascon, Michel Armand. Sacrificial salts: Compensating the initial charge irreversibility in lithium batteries, Electrochemistry Communications 12 1344-1347. (Year: 2010).*
(Continued)

*Primary Examiner* — Carlos Barcena
(74) *Attorney, Agent, or Firm* — Birch, Stewart, Kolasch & Birch, LLP

(57) ABSTRACT

A lithium secondary battery including a positive electrode, a negative electrode comprising a negative electrode current collector, and an electrolyte interposed between the positive electrode and negative electrode. The lithium metal is formed on the negative electrode current collector by lithium ions migrating toward the negative electrode current collector after charge. The electrolyte comprises a sacrificial salt having an oxidation potential of 5 V or less with respect to lithium. The lithium secondary battery forms lithium metal while being blocked from the atmosphere, and thereby improves an existing problem caused by high reactivity of lithium metal. By including a sacrificial salt in an electrolyte, lithium consumption caused by an irreversible reaction (Continued)

of a negative electrode is reduced, which may prevent decline in the battery capacity and lifetime properties.

16 Claims, 3 Drawing Sheets

(51) Int. Cl.
    *H01M 4/139*     (2010.01)
    *H01M 10/052*     (2010.01)
    *H01M 10/0565*     (2010.01)
    *H01M 10/0568*     (2010.01)
    *H01M 10/44*     (2006.01)

(52) U.S. Cl.
    CPC ..... *H01M 10/052* (2013.01); *H01M 10/0565* (2013.01); *H01M 10/0568* (2013.01); *H01M 10/44* (2013.01)

(56) References Cited

U.S. PATENT DOCUMENTS

| | | | |
|---|---|---|---|
| 6,365,300 | B1 | 4/2002 | Ota et al. |
| 6,548,212 | B1 | 4/2003 | Heider et al. |
| 7,282,300 | B2 * | 10/2007 | Goh ............... H01M 4/131 429/231.95 |
| 2004/0157124 | A1 | 8/2004 | Goh et al. |
| 2004/0209159 | A1 * | 10/2004 | Lee ............... H01M 4/134 429/231.95 |
| 2006/0257737 | A1 | 11/2006 | Goh et al. |
| 2013/0171524 | A1 | 7/2013 | Cho et al. |
| 2013/0188294 | A1 | 7/2013 | Kim et al. |
| 2013/0298366 | A1 | 11/2013 | Tarasoon et al. |
| 2015/0064568 | A1 * | 3/2015 | Yushin ............... H01M 10/4235 429/233 |
| 2015/0364795 | A1 | 12/2015 | Stefan et al. |
| 2016/0036091 | A1 | 2/2016 | Ohtomo et al. |
| 2016/0197661 | A1 | 7/2016 | Song et al. |
| 2017/0104209 | A1 | 4/2017 | Son et al. |
| 2017/0133660 | A1 | 5/2017 | Kurihara et al. |
| 2018/0048025 | A1 * | 2/2018 | Jilek ............... H01M 10/052 |
| 2018/0219250 | A1 | 8/2018 | Delobel |
| 2018/0323430 | A1 | 11/2018 | Son et al. |
| 2018/0323467 | A1 | 11/2018 | Tang et al. |
| 2019/0067702 | A1 | 2/2019 | Son et al. |

FOREIGN PATENT DOCUMENTS

| | | | |
|---|---|---|---|
| JP | 2000-268863 | A | 9/2000 |
| JP | 2004-220894 | A | 8/2004 |
| JP | 3578016 | B2 | 10/2004 |
| JP | 2010-231980 | A | 10/2010 |
| JP | 2013-529830 | A | 7/2013 |
| JP | 2015-69809 | A | 4/2015 |
| JP | 2018-36867 | A | 5/2016 |
| KR | 10-0285123 | B1 | 3/2001 |
| KR | 10-0484713 | B1 | 4/2005 |
| KR | 10-2006-0111393 | A | 10/2006 |
| KR | 10-0835684 | B1 | 10/2006 |
| KR | 10-2012-0635131 | A | 4/2012 |
| KR | 10-2012-0122789 | A | 11/2012 |
| KR | 10-2013-0079109 | A | 7/2013 |
| KR | 10-2013-0112557 | A | 10/2013 |
| KR | 10-2013-0134949 | A | 12/2013 |
| KR | 10-1383360 | B1 | 4/2014 |
| KR | 10-2015-0041978 | A | 4/2015 |
| KR | 10-1627997 | B1 | 6/2015 |
| KR | 10-1661521 | B1 | 9/2015 |
| KR | 10-2015-0143372 | A | 12/2015 |
| KR | 10-2016-0016706 | A | 2/2016 |
| KR | 20160015708 | A * | 2/2016 ........ H01M 10/0567 |
| KR | 10-2016-0052323 | A | 6/2016 |
| KR | 10-2016-0138120 | A | 12/2016 |
| KR | 10-2017-0003208 | A | 1/2017 |
| KR | 10-2017-0045173 | A | 4/2017 |
| KR | 10-2018-0010423 | A | 1/2018 |
| KR | 10-2018-0007796 | A | 3/2018 |
| KR | 10-2018-0067586 | A | 6/2018 |
| WO | WO 2015/192081 | A1 | 12/2015 |
| WO | WO 2016/209571 | A1 | 12/2016 |
| WO | WO 2017/037363 | A1 | 3/2017 |
| WO | WO 2018/112801 | A1 | 6/2018 |

OTHER PUBLICATIONS

Extended European Search Report, dated Jul. 27, 2021, for European Application No. 19878357.3.
International Search Report (PCT/ISA/210) issued in PCT/KR2019/014498, dated Feb. 6, 2020.
Shanmukaraj et al., "Sacrificial salts: Compensating the initial charge irreversibility in lithium batteries." Electrochemistry Communications, vol. 12, 2010, pp. 1344-1347.

* cited by examiner

LITHIUM SECONDARY BATTERY

TECHNICAL FIELD

This application claims the benefit of Korean Patent Application No. 10-2018-0130620 on Oct. 30, 2018 and Korean Patent Application No. 10-2019-0136866 on Oct. 30, 2019 with the Korean Intellectual Property Office, the disclosure of which are herein incorporated by reference in their entirety.

The present invention relates to a lithium secondary battery having a negative electrode free structure using an electrolyte including a sacrificial salt.

BACKGROUND ART

With the rapid development of electric, electronic, communications and computer industries, demands for high performance and high stability secondary batteries have rapidly increased recently. Particularly, with the trend of battery and electronic products being lighter, thinner, smaller and portable, weight lightening and miniaturization have been required for a second battery, a key component, as well. In addition, as the needs for a new type of energy supply has increased due to an environmental pollution problem and fossil exhaustion, necessity for developing an electric vehicle capable of resolving such a problem has increased. Among various secondary batteries, lithium secondary batteries that are light, exhibit high energy density and operating potential, and have a long cycle lifetime have recently received attention.

A lithium secondary battery has a structure in which an electrode assembly including a positive electrode, a negative electrode, and a separator provided between the positive electrode and the negative electrode is laminated or wound, and is formed by embedding this electrode assembly in a battery case, and injecting a non-aqueous electrolyte liquid thereinto. At this time, capacity of the lithium secondary battery varies depending on the type of an electrode active material, and commercialization has not been achieved since sufficient capacity as theoretical capacity has not been secured during actual driving.

In order to obtain high capacity of a lithium secondary battery, a metal-based material such as silicon (4,200 mAh/g) or tin (990 mAh/g) having high storage capacity properties through an alloying reaction with lithium has been used as a negative electrode active material. However, when using a metal such as silicon or tin as a negative electrode active material, the volume significantly expands to approximately 4 times during a charging process of alloying with lithium, and shrinks during discharge. Due to such large changes in the volume of the electrode repeatedly occurring during charge and discharge, the active material is gradually micronized and deintercalated from the electrode resulting in a rapid decrease in the capacity, and as a result, commercialization has not been achieved since stability and reliability have not been secured.

Compared to the negative electrode active material described above, lithium metal has excellent theoretical capacity of 3,860 mAh/g, and has very low standard reduction potential (Standard Hydrogen Electrode; SHE) of −3.045 V enabling a battery with high capacity and high energy density, and therefore, extensive studies on lithium metal batteries (LMB) using lithium metal as a negative electrode active material of a lithium secondary battery have been progressed.

However, when using lithium metal as a negative electrode of a battery, the battery is generally manufactured by attaching lithium foil on a planar current collector. And since lithium explosively reacts with water and readily reacts with oxygen in the atmosphere as an alkali metal having high reactivity, manufacturing and use are difficult under a general environment. Particularly, when lithium metal is exposed to the atmosphere, an oxide layer (native layer) such as $LiOH$, $Li_2O$ or $Li_2CO_3$ is formed on the surface as a result of oxidation. Such an oxide layer functions as an insulating film lowering electric conductivity and inhibiting lithium ion migration, and a problem of increasing internal resistance of a battery occurs.

Due to such high instability of lithium metal, lithium metal batteries using lithium metal as a negative electrode have not been commercialized.

Accordingly, various methods for commercializing lithium metal batteries by improving the problems described above have been studied.

As one example, Korean Patent No. 10-0635684 relates to a method for forming a lithium electrode having a glass protective layer, and discloses a method of preparing a lithium electrode by forming a protective layer on a release agent layer-deposited substrate (PET), depositing lithium on the protective layer, and then depositing a current collector on the lithium.

Although the prior art document somewhat improved a problem of forming an oxide layer, which is due to lithium metal reactivity, by conducting a vacuum deposition process when forming a lithium negative electrode, fundamentally suppressing oxide layer formation has not yet been achieved since the electrode is still exposed to the atmosphere during a battery assembling process. Accordingly, development of a lithium metal battery capable of increasing energy density by using lithium metal while resolving a problem of high lithium reactivity, and capable of further simplifying the process has been required.

PRIOR ART DOCUMENTS

Patent Documents

Korean Patent No. 10-0635684 (2006 Oct. 11), ENCAPSULATED LITHIUM ELECTRODES HAVING GLASS PROTECTIVE LAYERS AND METHOD FOR THEIR PREPARATION

DISCLOSURE

Technical Problem

As a result of extensive studies in view of the above, the inventors of the present invention have designed a negative electrode free battery structure capable of forming lithium metal on a negative electrode current collector using lithium ions transferred through charge after assembling the battery so as to fundamentally block a contact between the lithium metal and the atmosphere when assembling the battery, have identified that, by including a sacrificial salt in the electrolyte as an additive, battery capacity and lifetime are enhanced by improving reactivity and stability of the lithium metal, and have completed the present invention.

Accordingly, an aspect of the present invention provides a lithium secondary battery having enhanced performance and lifetime by resolving problems caused by high reactivity of lithium metal.

Technical Solution

According to an aspect of the present invention, there is provided a lithium secondary battery including a positive electrode, a negative electrode comprising a negative electrode current collector, and an electrolyte interposed between the positive electrode and negative electrode, wherein lithium metal is formed on the negative electrode current collector by lithium ions migrating toward the negative electrode current collector after charge, and the electrolyte includes a sacrificial salt having an oxidation potential of 5 V or less with respect to lithium.

The sacrificial salt may have oxidation potential in a range of from 3 V to 4.8 V with respect to lithium.

The sacrificial salt may have irreversible capacity of from 100 mAh/g to 600 mAh/g.

The sacrificial salt may include lithium.

The sacrificial salt may include at least one selected from the group consisting of $LiN_3$, $Li_2C_2O_4$, $Li_2C_4O_4$, $Li_2C_3O_5$, $Li_2C_4O_6$, $LiCF_3CO_2$, $LiC_2F_5CO_2$, LiTC, LiVFB, LiBBB and LiBFB.

The sacrificial salt may be present in an amount of from 0.1% by weight to 30% by weight based on a total 100% by weight of the electrolyte.

The electrolyte may further include a lithium salt and an organic solvent.

The lithium ion may be derived from the positive electrode or the electrolyte.

The lithium metal may be formed through after a first charge in a voltage range of from 4.8 V to 2.5 V.

The negative electrode may further include a protective film on a surface in contact with a separator.

Advantageous Effects

A lithium secondary battery according to the present invention is coated while being blocked from the atmosphere through a process of forming lithium metal on a negative electrode current collector, and therefore, is capable of suppressing formation of a surface oxide layer on the lithium metal caused by oxygen and moisture in the atmosphere, and as a result, an effect of enhancing cycle lifetime properties is obtained. Particularly, by including a sacrificial salt in an electrolyte, battery capacity can be maximized by preventing an irreversible capacity loss occurring during a charge and discharge process, and a long lifetime can be obtained.

BEST MODE

Figure 1:
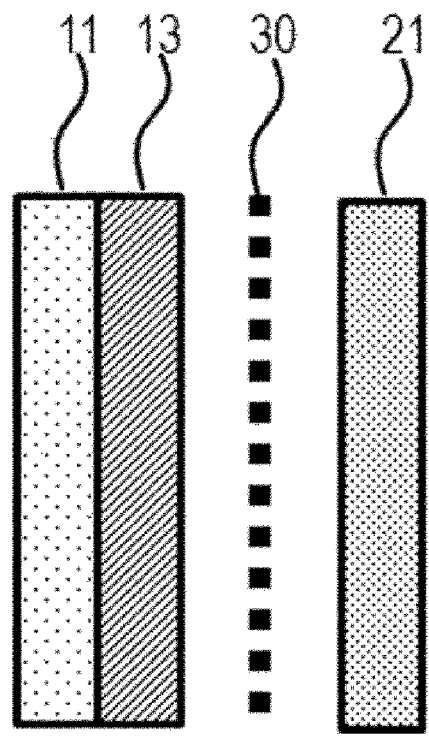
FIG. 1 is a mimetic diagram of a lithium secondary battery manufactured according to one embodiment of the present invention.

Hereinafter, the present invention will be described in detail with reference to accompanying drawings so that those skilled in the art readily implement the present invention. However, the present invention may be embodied in various different forms, and is not limited to the present specification.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

A term "negative electrode free (anode free) battery" used in the present invention generally means a lithium secondary battery including a negative electrode having a form in which a negative electrode mixture included in the negative electrode is formed by charge and discharge of the battery. At this time, the anode has the same meaning as the negative electrode.

In other words, in the present invention, a negative electrode free battery is a concept including both a battery that is negative electrode free in which a negative electrode is not formed on a negative electrode current collector when initially assembling the battery, or a battery that may have a negative electrode formed on a negative electrode current collector according to use.

In addition, in the negative electrode of the present invention, a form of lithium metal formed as a negative electrode on a negative electrode current collector includes both a form in which lithium metal is formed in a layer, and a structure in which lithium metal is not formed in a layer (for example, a structure in which lithium metal aggregates in a particle form).

Hereinafter, the present invention will be described based on a lithium metal layer form in which lithium metal is formed in a layer, however, it is clear that such a description does not exclude a structure in which lithium metal is not formed in a layer.

FIG. 1 is a sectional diagram of a lithium secondary battery manufactured according to one embodiment of the present invention, and is comprised of a positive electrode including a positive electrode current collector (11) and a positive electrode mixture (13); a negative electrode including a negative electrode current collector (21), a first protective layer (not shown) and a second protective layer (not shown), and a separator (30) and an electrolyte (not shown) interposed therebetween.

In a common lithium secondary battery, a negative electrode includes a negative electrode current collector and a negative electrode mixture formed on the negative electrode current collector. However, in the present invention, only a negative electrode current collector is used to be assembled to a negative electrode free battery structure, and then, lithium ions deintercalated from a positive electrode mixture by charge form lithium metal on the negative electrode current collector as a negative electrode mixture, and as a result, a negative electrode having a known constitution of a negative electrode current collector and a negative electrode mixture is formed to obtain a constitution of a common lithium secondary battery.

Figure 2:
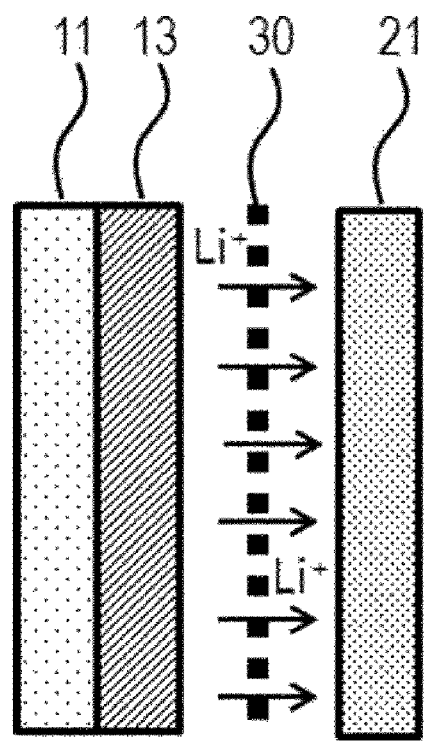
FIG. 2 is a mimetic diagram illustrating lithium ion ($Li^+$) migration when initially charging the lithium secondary battery manufactured according to one embodiment of the present invention.
Figure 3:
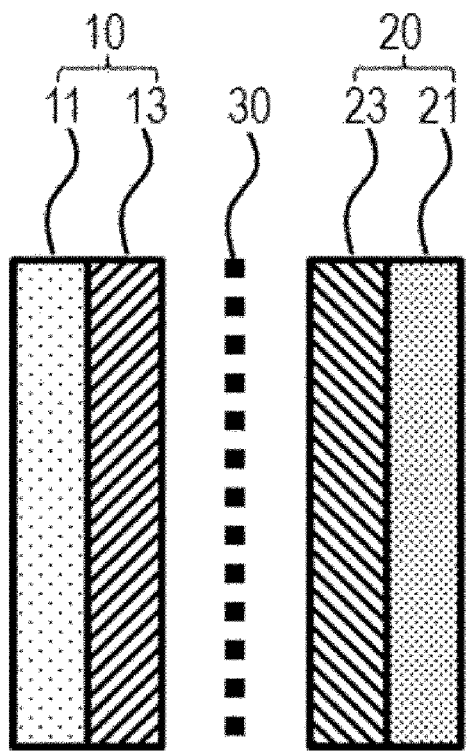
FIG. 3 is a mimetic diagram after completing initial charge on the lithium secondary battery manufactured according to one embodiment of the present invention.

FIG. 2 is a mimetic diagram illustrating lithium ion (Li$^+$) migration when initially charging the lithium secondary battery manufactured according to one embodiment of the present invention, and FIG. 3 is a mimetic diagram after completing initial charge on the lithium secondary battery manufactured according to one embodiment of the present invention.

According to FIG. 2 and FIG. 3, when a lithium secondary battery having a negative electrode free battery structure is charged by applying a voltage of a certain level or higher, lithium ions produced from a positive electrode mixture (13) in a positive electrode (10) or an electrolyte (not shown) migrate toward a negative electrode current collector (21) side after passing through a separator (30), and form lithium metal (23) formed purely with lithium on the negative electrode current collector (21) to form a negative electrode (20).

Such lithium metal (23) formation through charge has advantages of forming a thin film layer and very readily adjusting interfacial properties when compared to an existing negative electrode obtained by sputtering lithium metal (23) on a negative electrode current collector (21) or laminating lithium foil and a negative electrode current collector (21). In addition, since bonding strength of the lithium metal (23) laminated on the negative electrode current collector (21) is large and stable, a problem of being removed from the negative electrode current collector (21) caused by going back to an ionized state through discharge does not occur.

In addition, when forming to a negative electrode free battery structure, lithium metal is not exposed to the atmosphere at all during a battery assembling process, which fundamentally blocks existing problems such as formation of an oxide layer on the surface caused by high reactivity of the lithium itself and a decrease in the lifetime of a lithium secondary battery resulting therefrom.

Particularly, in order to improve a problem of high chemical and electrochemical reactivity of lithium metal and to secure effects of improving battery performance and lifetime, the lithium secondary battery according to the present invention includes a sacrificial salt having low oxidation stability in the electrolyte as an additive.

As described above, lithium metal is highly reactive and is thereby very vulnerable in terms of stability. In addition thereto, in a lithium secondary battery including lithium metal as a negative electrode, lithium reacts with some components forming an electrolyte during an initial charge and discharge process to form a passivation layer (solid electrolyte interphase; SEI) on the surface in order to prevent side reactions between the negative electrode and the electrolyte and for stable driving by reversibility maintaining the amount of lithium ions in the electrolyte. However, since a certain amount of lithium is inevitably consumed in the passivation layer formation, the amount of reversible lithium is inevitably reduced compared to initial design. Lithium consumed in such an irreversible reaction serves as irreversible capacity reducing capacity of a battery. In addition, such a passivation layer is continuously formed during charge and discharge, which continuously consumes lithium metal and gradually reduces the amount of reversible lithium, and as a result, charge and discharge efficiency decreases.

In view of the above, the present invention prevents an irreversible capacity loss caused by passivation layer formation during initial charge and discharge by including a sacrificial salt having low oxidation stability. In other words, the sacrificial salt may be dissociated, moved to a negative electrode, and reduced to be obtained as charge and discharge capacity, and therefore, may enhance battery capacity and lifetime properties by reducing the amount of lithium consumed during charge and discharge.

Specifically, the sacrificial salt included in the electrolyte of the present invention is dissociated during a charge and discharge process of a lithium secondary battery irreversibly providing an excess amount of lithium ions, and such lithium ions may be reduced to lithium metal after migrating to a negative electrode. Accordingly, the sacrificial salt may either provide lithium ions irreversibly consumed in the passivation layer formation during initial charge and discharge, or perform a role of a lithium source compensating the amount of lithium ions already consumed in the passivation layer formation, or perform a role of both, and as a result, may prevent an irreversible capacity loss of a battery inevitably accompanied with passivation layer formation.

In the present invention, the sacrificial salt may have oxidation potential of 5 V or less, and preferably in a range of from 3 V to 4.8 V with respect to lithium. By the oxidation potential of the sacrificial salt corresponding to the above-described range with respect to lithium, the sacrificial salt is oxidized at an initial charging voltage of a battery, and at this time, lithium ions may be reduced in a negative electrode current collector to form a lithium metal negative electrode.

In addition, the sacrificial salt is capable of irreversibly providing an excess amount of lithium ions during a first charge and discharge cycle, and irreversible capacity (first cycle charge capacity-first cycle discharge capacity) of the first charge and discharge cycle of the sacrificial salt may be from 100 mAh/g to 600 mAh/g, and preferably from 200 mAh/g to 570 mAh/g. When the irreversible capacity of the sacrificial salt is less than the above-mentioned range, the amount to be added to an electrolyte liquid increases, and a problem of battery volume expansion may occur by the gas generated during the charge and discharge. When the irreversible capacity is greater than the above-mentioned range on the contrary, elements other than lithium forming the sacrificial salt increase causing an increase in the amount of gas generated during the charge and discharge, and a problem of battery volume expansion may occur as in the case in which the irreversible capacity is less than the above-mentioned range.

The sacrificial salt is not limited as long as it is a material corresponding to the above-described potential and irreversible capacity ranges, and, for example, may include lithium as a cation.

For example, the sacrificial salt may include at least one selected from the group consisting of $LiN_3$, $Li_2C_2O_4$, $Li_2C_4O_4$, $Li_2C_3O_5$, $Li_2C_4O_6$, $LiCF_3CO_2$, $LiC_2F_5CO_2$, lithium thiocyanate (LiTC), lithium 2,2-difluoro-1,3,2-dioxaborol-2-uide (LiVFB), lithium-bis[1,2-benzenediolato(2-)-0,0']borate (LiBBB) and lithium-bis[perfluoro-1,2-benzenediolato(2-)-0,0']borate (LiBFB). Preferably, the sacrificial salt may be at least one selected from the group consisting of $LiN_3$, LiVFB and LiBBB.

The sacrificial salt may be included in an amount of from 0.1% by weight to 30% by weight, and preferably from 2% by weight to 15% by weight based on a total 100% by weight of the electrolyte. The sacrificial salt being included in less than the above-mentioned range may have a problem of reducing a battery lifetime since lithium of a negative electrode is not sufficiently formed. On the contrary, the sacrificial salt being included in greater than the above-mentioned range increases viscosity of an electrolyte liquid, decreases lithium ion conductivity of the electrolyte liquid, and may cause a problem in battery safety due to the gas generated during charge.

The electrolyte of the present invention includes an electrolyte salt, and the electrolyte salt is for electrochemically reducing the lithium ions, which are produced by oxidation during charge, in the negative electrode.

The electrolyte may be a non-aqueous electrolyte formed with a non-aqueous organic solvent that does not react with lithium metal, and an electrolyte salt, and may include an organic solid electrolyte or an inorganic solid electrolyte in addition thereto, however, the electrolyte is not limited thereto.

As the non-aqueous organic solvent, those commonly used in an electrolyte liquid for a lithium secondary battery may be used without limit, and for example, ether, ester, amide, linear carbonate, cyclic carbonate and the like may each be used either alone, or as a mixture of two or more types. Among these, ether-based compounds may be typically included.

The ether-based compound may include a non-cyclic ether and cyclic ether.

For example, as the non-cyclic ether, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether may be used, however, the non-cyclic ether is not limited thereto.

As one example of the cyclic ether, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene and isosorbide dimethyl ether may be used, however, the cyclic ether is not limited thereto.

As the ester of the organic solvent, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types may be used, however, the ester is not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, however, the linear carbonate compound is not limited thereto.

In addition, specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof, or a mixture of two or more types thereof. Examples of the halides thereof may include fluoroethylene carbonate (FEC) and the like, but are not limited thereto.

The electrolyte salt included in the non-aqueous electrolyte is a lithium salt. The lithium salt may be used without limit as long as it is commonly used in an electrolyte liquid for a lithium secondary battery. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As one example, the lithium salt may include at least one selected form the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$ and $(CF_3SO_2)_3 CLi$.

The concentration of the lithium salt may be properly determined considering ion conductivity, solubility or the like, and for example, may be from 0.1 M to 4.0 M, and preferably from 0.5 M to 2.0 M.

When the lithium salt concentration is less than the above-mentioned range, it is difficult to secure ion conductivity suitable for battery driving, and when the concentration is greater than the above-mentioned range on the contrary, viscosity of the electrolyte liquid increases decreasing lithium ion mobility, and battery performance may decline by increasing a decomposition reaction of the lithium salt itself increases, and therefore, the concentration is properly adjusted in the above-mentioned range.

With the purpose of improving charge and discharge properties, flame retardancy and the like, pyridine, triethylphosphite, triethanolamine, cyclic ether, ethylenediamine, n-glyme, hexamethylphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added as an example to the non-aqueous electrolyte. In some cases, halogen-containing solvents such as carbon tetrachloride and trifluoroethylene may be further included in order to provide nonflammability, and carbon dioxide gas may be further included in order to enhance high temperature storage properties.

The non-aqueous electrolyte liquid may be injected at a proper stage in an electrochemical device manufacturing process depending on a manufacturing process and required properties of a final product. In other words, the non-aqueous electrolyte liquid may be used at a stage prior to assembling an electrochemical device or at a final stage of electrochemical device assembly.

As the organic solid electrolyte, for example, polyethylene derivatives, polyethylene oxide derivatives, polypropylene oxide derivatives, phosphoric acid ester polymers, polyalginate lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ or $Li_3PO_4$—$Li_2S$—$SiS_2$ may be used.

In the present invention, the negative electrode current collector (21) may have lithium metal (23) formed by charge, and is not particularly limited as long as it has conductivity without inducing chemical changes to a lithium secondary battery. Examples thereof may include copper, stainless steel, aluminum, nickel, titanium, palladium, baked carbon, copper or stainless steel of which surface is treated with carbon, nickel, titanium, silver or the like, aluminum-cadmium alloys and the like.

At this time, in order to increase adhesive strength with the negative electrode active material, the negative electrode current collector (21) may be used in various forms such as films, sheets, foil, nets, porous bodies, foams or non-woven fabrics having micro unevenness formed on the surface.

Preferably, the negative electrode current collector (21) has a three-dimensional structure form having pores formed therein, and may have a thickness of from 20 μm to 200 μm, preferably from 50 μm to 150 μm, and more preferably from 80 μm to 120 μm. When the thickness of the negative electrode current collector (21) is less than the above-mentioned range, lithium metal formed in the negative electrode current collector (21) is formed outside the porous current collector decreasing a lithium dendrite suppressing effect, and battery performance may decline. When the thickness is greater than the above-mentioned range, the battery thickness becomes large, which may be disadvantageous for commercialization.

The negative electrode current collector (21) may have porosity of from 50% to 90%, preferably from 60% to 85%, and more preferably from 70% to 85%. When the porosity of the negative electrode current collector (21) is less than the above-mentioned range, lithium metal formed in the negative electrode current collector is formed outside the porous current collector decreasing a lithium dendrite suppressing effect, and when the porosity is greater than the above-mentioned range, the negative electrode current collector (21) may have unstable strength making a battery manufacturing process difficult.

The lithium secondary battery having a negative electrode free structure may be obtained using various methods, but, in the present invention, may be secured by controlling a composition used in the positive electrode mixture (13).

As the positive electrode mixture (13), various positive electrode active materials may be used depending on the battery type, and the positive electrode active material used in the present invention is not particularly limited as long as it is a material capable of intercalating or deintercalating lithium ions, however, a lithium transition metal oxide is typically used currently as a positive electrode active material capable of obtaining a battery having excellent lifetime properties and charge and discharge efficiency.

As the lithium transition metal oxide, layer compounds such as lithium cobalt oxide ($LiCoO_2$) or lithium nickel oxide ($LiNiO_2$) including two or more transition metals, and for example, substituted with one or more transition metals; lithium manganese oxide substituted with one or more transition metals, lithium nickel-based oxides, spinel-based lithium nickel manganese composite oxides, spinel-based lithium manganese oxides in which some of Li of the chemical formula are substituted with alkaline-earth metals, olivine-based lithium metal phosphates and the like may be included, however, the lithium transition metal oxide is not limited thereto.

The lithium transition metal oxide is preferably used as the positive electrode active material, and for example, at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, and $a+b+c=1$), $LiNi_{1-y}Co_yO_2$, $LiCo_{1-y}M-n_yO_2$, $LiNi_{1-y}Mn_yO_2$ (herein, $0\leq Y<1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ (herein, $0<Z<2$), $Li_xM_yMn_{2-y}O_{4-z}A_z$ (herein, $0.9\leq x\leq 1.2$, $0<y<2$, $0\leq z<0.2$, M=one or more of Al, Mg, Ni, Co, Fe, Cr, V, Ti, Cu, B, Ca, Zn, Zr, Nb, Mo, Sr, Sb, W, Ti and Bi, and A is one or more anions of −1 or −2 valency), $Li_{1+a}Ni_bM'_{1-b}O_{2-c}A'_c$ ($0\leq a\leq 0.1$, $0\leq b\leq 0.8$, $0\leq c<0.2$, and M' is one or more types selected from the group consisting of octahedral stable elements such as Mn, Co, Mg or Al, and A' is one or more anions of −1 or −2 valency), $LiCoPO_4$ and $LiFePO_4$ may be used. In addition to such oxides, sulfides, selenides, halides and the like may also be used.

The lithium transition metal oxide may be used in the positive electrode mixture (13) as a positive electrode active material together with a binder, a conductive material and the like. In the negative electrode free battery structure of the present invention, a lithium source for forming lithium metal (23) becomes the lithium transition metal oxide or the sacrificial salt of the electrolyte. In other words, when conducting charging in a specific voltage range, lithium ions in the lithium transition metal oxide are released in the positive electrode forming lithium metal (23) on the negative electrode current collector (21).

However, as for actual lithium ions in a lithium transition metal oxide, there is no lithium capable of forming a lithium negative electrode other than capacity obtained in charge and discharge at the above-mentioned operating voltage level making it very difficult to form lithium metal (23), and even when formed, the amount is not sufficient declining battery lifetime properties. As a result, irreversible capacity greatly decreases when using only a lithium transition metal oxide causing a problem of declining lifetime properties of a lithium secondary battery.

In view of the above, a lithium metal compound that is a highly irreversible material having a difference between charge capacity and discharge capacity (irreversible capacity) of 200 mAh/g or more initial irreversibility of 25% or greater when conducting a first charge at from 0.01 C to 0.2 C in a voltage range of from 4.8 V to 2.5 V is used together as an additive capable of providing a lithium source to the lithium transition metal oxide in the present invention.

The term "highly irreversible material" mentioned in the present invention may be used in the same manner as "large capacity irreversible material" in another term, and this means a material having a high irreversible capacity ratio of a first charge and discharge cycle, that is, high "(first cycle charge capacity-first cycle discharge capacity)/first cycle charge capacity". In other words, a highly irreversible material may irreversibly provide an excess amount of lithium ions during a first charge and discharge cycle. For example, among lithium transition metal compounds capable of intercalating and deintercalating lithium ions, a positive electrode material having large irreversible capacity of a first charge and discharge cycle (first cycle charge capacity-first cycle discharge capacity) may be considered.

Irreversible capacity of a generally used positive electrode active material is approximately from 2% to 10% with respect to initial charge capacity, but in the present invention, is preferably 25% or greater and more preferably 50% or greater with respect to initial charge capacity, and a lithium metal compound is used as the highly irreversible material of the present invention having initial charge capacity of 200 mAh/g or greater, and preferably 230 mAh/g or greater. Using such a lithium metal compound may perform a role of a lithium source capable of forming lithium metal (23) while increasing irreversible capacity of the lithium transition metal oxide that is the positive electrode active material.

As the lithium metal compound provided in the present invention, compounds represented by the following Chemical Formula 1 to Chemical Formula 8 may be used:

$$Li_2Ni_{1-a}M^1{}_aO_2 \quad [\text{Chemical Formula 1}]$$

(in the formula, 0≤a<1, and $M^1$ is an element of at least one selected from the group consisting of Mn, Fe, Co, Cu, Zn, Mg and Cd), $$Li_{2+b}Ni_{1-c}M^2{}_cO_{2+d} \quad [\text{Chemical Formula 2}]$$

(in the formula, −0.5≤b<0.5, 0≤c≤1, 0≤d<0.3, and $M^2$ is an element of at least one selected from the group consisting of P, B, C, Al, Sc, Sr, Ti, V, Zr, Mn, Fe, Co, Cu, Zn, Cr, Mg, Nb, Mo and Cd), $$LiM^3{}_eMn_{1-e}O_2 \quad [\text{Chemical Formula 3}]$$

(in the formula, 0≤e<0.5, and $M^3$ is an element of at least one or more types selected from the group consisting of Cr, Al, Ni, Mn and Co), $$Li_2M^4O_2 \quad [\text{Chemical Formula 4}]$$

(in the formula, $M^4$ is an element of at least one selected from the group consisting of Cu and Ni), $$Li_{3+f}Nb_{1-g}M^5{}_gS_{4-h} \quad [\text{Chemical Formula 5}]$$

(in the formula, −0.1≤f≤1, −0≤g≤0.5, −0.1≤h≤0.5, and $M^5$ is an element of at least one selected from the group consisting of Mn, Fe, Co, Cu, Zn, Mg and Cd), $$LiM^6{}_iMn_{1-i}O_2 \quad [\text{Chemical Formula 6}]$$

(in the formula, 0.05≤i<0.5, and $M^6$ is an element of at least one selected from the group consisting of Cr, Al, Ni, Mn and Co), $$LiM^7{}_{2j}Mn_{2-2j}O_4 \quad [\text{Chemical Formula 7}]$$

(in the formula, 0.05≤j<0.5, and $M^7$ is an element of at least one selected from the group consisting of Cr, Al, Ni, Mn and Co), and $$Li_k\text{-}M^8{}_mN_n \quad [\text{Chemical Formula 8}]$$

(in the formula, $M^8$ represents an alkaline-earth metal, k/(k+m+n) is from 0.10 to 0.40, m/(k+m+n) is from 0.20 to 0.50, and n/(k+m+n) is from 0.20 to 0.50).

The lithium metal compounds of Chemical Formula 1 to Chemical Formula 8 have differences in the irreversible capacity depending on the structure. These may be used either alone or as a mixture, and perform a role of increasing irreversible capacity of the positive electrode active material.

As one example, the highly irreversible materials represented by Chemical Formulae 1 and 3 have different irreversible capacity depending on the type, and as one example, have values as listed in the following Table 1.

TABLE 1

|  | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 1] $Li_2NiO_2$ | 370 | 110 | 29.7% | 70.3% |
| [Chemical Formula 3] $LiMnO_2$ | 230 | 100 | 43.5% | 56.5% |
| [Chemical Formula 3] $LiCr_xMn_{1-x}O_2$ | 230 | 80 | 34.8% | 65.2% |

In addition, the lithium metal compound of Chemical Formula 2 may preferably belong to the space group Immm, and in the group, Ni and M composite oxide forming a planar tetrahedron (Ni, M)O4 with the planar tetrahedral structure forming a primary chain while sharing a facing side (side formed with O—O) may be more preferred. The compound of Chemical Formula 2 may preferably have a crystal lattice constant of a=3.7±0.5 Å, b=2.8±0.5 Å, c=9.2±0.5 Å, α=90°, β=90° and γ=90°.

In addition, in the lithium metal compound of Chemical Formula 8, the content of the alkaline-earth metal may be from 30 atomic % to 45 atomic %, and the content of the nitrogen may be from 30 atomic % to 45 atomic %. At this time, when the alkaline-earth metal content and the nitrogen content are in the above-mentioned ranges, the compound of Chemical Formula 1 has excellent thermal properties and lithium ion conducting properties. In Chemical Formula 8, k/(k+m+n) may be from 0.15 to 0.35 and, for example, from 0.2 to 0.33, m/(k+m+n) may be from 0.30 to 0.45 and, for example, from 0.31 to 0.33, and n/(k+m+n) may be from 0.30 to 0.45 and, for example, from 0.31 to 0.33.

In the electrode active material of Chemical Formula 1, a may be from 0.5 to 1, b may be 1, and c may be 1 according to one embodiment.

In the positive electrode mixture (13) according to the present invention, the positive electrode active material and the lithium metal compound need to be limited in each content thereof. In other words, parameters affected by the lithium metal compound content may include a thickness of the lithium metal (23) and a loading amount in the positive electrode active material, and these two are in a trade-off relation with each other.

Lifetime properties are generally improved as a lithium metal (23) thickness increases. Accordingly, when the content of the lithium metal compound, a lithium source, is high, an advantage of increasing a thickness of the lithium metal (23) formed on the negative electrode current collector (21) may be secured, however, there is a problem in that a loading amount of the loaded positive electrode active material in the whole positive electrode mixture decreases. Such a decreased loading amount of the positive electrode active material causes a decrease in the overall battery capacity. On the other hand, having a low lithium metal compound content has a high loading amount of the positive electrode active material, but has a disadvantage of not sufficiently compensating irreversibility. However, lithium metal (23) relatively thinner than commercially available lithium foil may be formed, and thin-filming and weight-lightening of a battery may be achieved.

Due to such a reason, in the positive electrode mixture (13) provided in the present invention, the positive electrode active material and the lithium metal compound (positive electrode active material:lithium metal compound) may be used in a weight ratio of from 5:95 to 100:0, preferably from 10:90 to 90:10, and more preferably from 30:70 to 70:30, and even more preferably, the lithium metal compound may be favorably used in 70% or less with respect to the total weight of the positive electrode mixture. Specifically, the positive electrode active material:the lithium metal compound may be preferably used in a weight ratio range of from 95:5 to 30:70. Through such a content range, the positive electrode mixture of the present invention may have a loading amount of from 1 mAh/cm$^2$ to 10 mAh/cm$^2$, preferably a loading amount of from 2 mAh/cm$^2$ to 10 mAh/cm$^2$, and more preferably a loading amount of from 3 mAh/cm$^2$ to 10 mAh/cm$^2$. In addition, by the lithium secondary battery of the present invention using such a positive electrode mixture, a secondary battery having lithium formed on a negative electrode current collector after first charge may be formed.

By adjusting irreversible capacity of the positive electrode, the lithium metal compounds of Chemical Formulae 1 to 8 are capable of forming lithium metal on the negative electrode without reducing battery capacity. The lithium metal compound is a material capable of deintercalating 1 mole or more of lithium ions during first cycle charge, and capable of intercalating and deintercalating 1 mole or less of lithium ions from first cycle discharge and cycles thereafter. Accordingly, when adding the lithium metal compound to the positive electrode, lithium is formed in the negative electrode as much as irreversible capacity of the positive electrode, and as a result, an excess amount of lithium (excess Li) having target capacity may be formed in the first cycle.

The positive electrode active material according to the present invention includes the lithium transition metal oxide and the lithium metal compounds of Chemical Formula 1 to Chemical Formula 8, and at this time, the form is not particularly limited as long as lithium may be irreversibly deintercalated from the lithium metal compound.

As one example, the positive electrode active material and the lithium metal compound may be dispersed into the positive electrode mixture (13) in a form mixed to each other or may form a core-shell structure. In the core-shell structure, the core may be the positive electrode active material or the lithium metal compound, and the shell may be lithium metal or the positive electrode active material. In addition, as necessary, a mixture form thereof may form each of the core and the shell. In addition, the shell may be formed in a single layer or a multilayer of one or more layers. Preferably, when forming the lithium metal compound in the shell, lithium ions may be readily deintercalated from the lithium metal compound by charging a battery.

In one specific example, the lithium metal compound may be coated on the current collector while being mixed with the positive electrode active material.

In another specific example, a first coating layer including the positive electrode active material is coated on the current collector, and a coating layer including the lithium metal compound may be coated on the first coating layer.

Specifically, the first coating layer is formed with the positive electrode active material, and a conductor and a binder, the second coating layer is formed with the lithium metal compound, and a conductor and a binder, and the lithium metal compound of the second coating layer may function as a protective layer of the first coating layer by being converted to an irreversible state during an activation process of a secondary battery.

In other words, the second coating layer has a metal compound form in which lithium is removed from the lithium metal compound, and is thereby thermally and electrochemically stable, and therefore, is capable of protecting the first coating layer by suppressing side reactions between the electrode and the electrolyte liquid, and the like.

Such a simply mixed or core-shell-structured positive electrode active material may be used depending on the content described above.

In addition, in the positive electrode mixture (13) according to the present invention, known materials capable of increasing irreversible capacity, for example, materials such as $Li_xVO_3$ (1≤x≤6), $Li_3Fe_2(PO_4)_3$, $Li_3Fe_2(SO_4)_3$ or $Li_3V(PO_4)_3$, or materials such as $MnO_2$, $MoO_3$, $VO_2$, $V_2O_5$, $V_6O_{13}$, $Cr_3O_8$, $CrO_2$, $Al_2O_3$, $ZrO_2$, $AlPO_4$, $SiO_2$, $TiO_2$ or MgO may be additionally used.

The materials are used in 60 parts by weight or less, parts by weight or less, and preferably 40 parts by weight or less with respect to 100 parts by weight of the positive electrode active material.

In the present invention, the charging for forming lithium metal (23) is conducted in a voltage range of from 4.8 V to 2.5 V. When the charging is conducted at a voltage level of less than the above-mentioned range, lithium metal (23) is difficult to form, and when the voltage level is greater than the above-mentioned range, the battery (cell) is damaged, and charge and discharge are not properly progressed after over-discharge occurs.

The lithium metal (23) formed above forms a uniform continuous or discontinuous layer on the negative electrode current collector (21). As one example, when the negative electrode current collector (21) has a foil form, a continuous thin-film form may be obtained, and when the negative electrode current collector (21) has a three-dimensional porous structure, lithium metal (23) may be discontinuously formed. In other words, the discontinuous layer means a form of being discontinuously distributed having, in a specific region, a region having lithium metal (23) is and a region not having lithium metal (23) present, and by the region not having lithium metal (23) being distributed to isolate, disconnect or separate the region having the lithium compound as an island-type, the region having lithium metal (23) is distributed without continuity.

The lithium metal (23) formed through such charge and discharge has a thickness of a minimum of 50 nm or greater, 100 μm or less, and preferably from 1 μm to 50 μm to function as a negative electrode. When the thickness is less than the above-mentioned range, battery charge and discharge efficiency rapidly decrease. When the thickness is greater than the above-mentioned range on the contrary, lifetime properties and the like are stable, however, there is a problem in that battery energy density decreases.

Particularly, by being manufactured to a negative electrode free battery with no lithium metal when assembling a battery, the lithium metal (23) provided in the present invention has no or little oxide layer formed thereon caused by high reactivity of the lithium generated during the assembling process, compared to an existing lithium secondary battery assembled using lithium foil. As a result, a lifetime degradation of a battery caused by the oxide layer may be prevented.

In addition, the lithium metal (23) is formed from lithium ions formed by charge of the highly irreversible material or decomposition of the sacrificial salt, and this may form more stable lithium metal (23) compared to forming lithium metal (23) on a positive electrode. When attaching lithium metal on a positive electrode, a chemical reaction between the positive electrode and the lithium metal may occur.

The positive electrode mixture (13) is formed including the positive electrode active material and the lithium metal compound, and herein, the positive electrode mixture (13) may further include a conductive material, a binder, and other additives commonly used in a lithium secondary battery.

The conductive material is used for further enhancing conductivity of the electrode active material. Such a conductive material is not particularly limited as long as it has conductivity without inducing chemical changes to the corresponding battery, and for example, graphite such as natural graphite or artificial graphite; carbon black such as super-P, carbon black, acetylene black, ketjen black, channel black, furnace black, lamp black and thermal black; conductive fibers such as carbon fiber or metal fiber; fluorocarbon; metal powders such as aluminum powder and nickel powder; conductive whiskers such as zinc oxide and potassium titanate; conductive metal oxides such as titanium oxide; polyphenylene derivatives, and the like may be used.

The binder may be further included for binding of the positive electrode active material, the lithium metal compound and the conductor, and binding for the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a fluorovinylidene-hexafluoropropylene copolymer, a fluorovinylidene-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a fluorovinylidene-hexafluoropropylene-tetrafluoroethylene copolymer, a fluorovinylidene-perfluoromethyl vinyl ether-tetrafluoroethylene copolymer, an ethylene-acrylic acid copolymer and the like may be used either alone or as a mixture, however, the binder is not limited thereto, and those that may be used as a binder in the art may all be used.

Examples of the other additives may include a filler. The filler is selectively used as a component suppressing electrode expansion, and is not particularly limited as long as it is a fibrous material without inducing chemical changes to the corresponding battery. For example, olefin-based polymers such as polyethylene or polypropylene, or fibrous materials such as glass fiber or carbon fiber may be used.

The positive electrode mixture (13) may be formed on the positive electrode current collector (11).

The positive electrode current collector is generally prepared to a thickness of from 3 μm to 500 μm. Such a positive electrode current collector (11) is not particularly limited as long as it has high conductivity without inducing chemical changes to a lithium secondary battery, and for example, copper, stainless steel, aluminum, nickel, titanium, palladium, baked carbon, copper or stainless steel of which surface is treated with carbon, nickel, silver or the like, aluminum-cadmium alloys and the like may be used.

At this time, in order to increase adhesive strength with the positive electrode active material, the positive electrode current collector (11) may be used in various forms such as films, sheets, foil, nets, porous bodies, foams or non-woven fabrics having micro unevenness formed on the surface.

The method of coating the positive electrode mixture (13) on the positive electrode current collector (11) may include a method of distributing electrode mixture slurry on the current collector and uniformly dispersing the result using a doctor blade and the like, a method of die casting, comma coating, screen printing, and the like. In addition, the electrode mixture slurry may be bonded to the current collector using a method of pressing or lamination after being molded on a separate substrate, however, the method is not limited thereto.

Meanwhile, as shown in the structure of FIG. 3, the lithium secondary battery according to the present invention includes a positive electrode (10), a negative electrode (20) and a separator (30) and an electrolyte (not shown) interposed therebetween, and, depending on the battery type, the separator (30) may not be included.

The separator (30) may be formed with a porous substrate, and as the porous substrate, porous substrates commonly used in electrochemical devices may all be used. Examples thereof may include polyolefin-based porous membranes or non-woven fabrics, but are not limited thereto.

The separator (30) according to present invention is not particularly limited in the material, and may be used without particular limit as long as it is commonly used as a separator (30) in a lithium secondary battery as a material physically separating a positive electrode and a negative electrode and having electrolyte and ion permeability. However, as a material that is porous, non-conductive or insulating, those having an excellent electrolyte liquid moisture retention ability while having low resistance for ion migration of the electrolyte liquid are preferred. For example, polyolefin-based porous membranes or non-woven fabrics may be used, however, the separator is not particularly limited thereto.

Examples of the polyolefin-based porous membrane may include membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or using a mixture thereof.

As the non-woven fabric other than the polyolefin-based non-woven fabric described above, non-woven fabrics formed with a polymer using, for example, polyphenylene oxide, polyimide, polyamide, polycarbonate, polyester such as polyethylene terephthalate, polyethylene naphthalate and polybutylene terephthalate, polyphenylene sulfide, polyacetal, polyethersulfone, polyetheretherketone, and the like alone, or using a mixture thereof may be included. Such a non-woven fabric has a fibrous form forming a porous web, and includes a spunbond or meltblown form formed with long fibers.

The thickness of the separator (30) is not particularly limited, but is preferably in a range of from 1 μm to 100 μm, and more preferably in a range of from 5 μm to 50 μm. When the thickness of the separator (30) is less than 1 μm, mechanical properties may not be maintained, and when the thickness is greater than 100 μm, the separator (30) functions as a resistive layer declining battery performance.

Pore size and porosity of the separator (30) are not particularly limited, however, the pore size is preferably from 0.1 μm to 50 μm, and the porosity is preferably from 10% to 95%. When the pore size of the separator (30) is less than 0.1 μm or the porosity is less than 10%, the separator (30) functions as a resistive layer, and when the pore size is greater than 50 μm or the porosity is greater than 95%, mechanical properties may not be maintained.

The lithium secondary battery according to the present invention may go through lamination (stack) of the separator and the electrode and folding processes in addition to winding, a general process.

The shape of the lithium secondary battery is not particularly limited, and may employ various shapes such as a cylinder-type, a lamination-type or a coin-type.

Meanwhile, the lithium secondary battery according to another embodiment of the present invention may have a protective film (55) on the negative electrode current collector (51) on a surface in contact with the separator (60).

Figure 4:
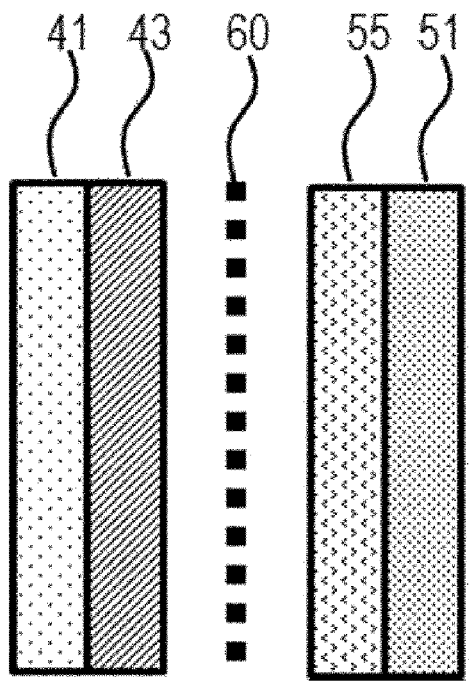
FIG. 4 is a mimetic diagram of a lithium secondary battery manufactured according to another embodiment of the present invention.
Figure 5:
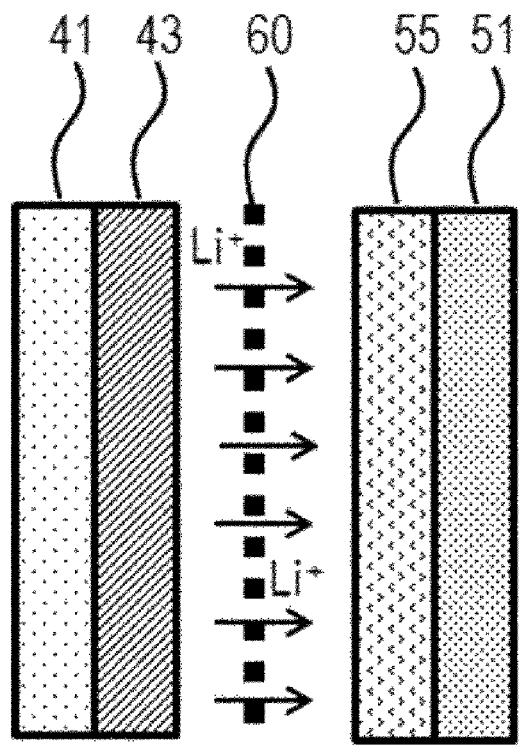
FIG. 5 is a mimetic diagram illustrating lithium ion ($Li^+$) migration when initially charging the lithium secondary battery manufactured according to another embodiment of the present invention.
Figure 6:
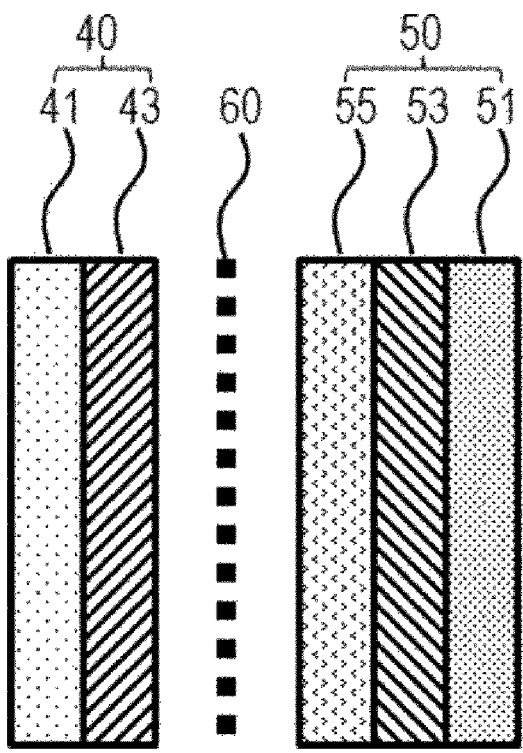
FIG. 6 is a mimetic diagram after completing initial charge on the lithium secondary battery manufactured according to another embodiment of the present invention.

In other words, when forming the protective film (55), lithium ions transferred from the positive electrode mixture (43) pass through the protective film (55), and form lithium metal (23) on the negative electrode current collector (51) as shown in FIG. 4.

Any material may be used as the protective film (55) as long as it is capable of smoothly transferring lithium ions, and materials used in a lithium ion conducting polymer and/or an inorganic solid electrolyte may be used. As necessary, a lithium salt may be further included.

Examples of the lithium ion conducting polymer may include any one selected from the group consisting of polyethylene oxide (PEO), polyacrylonitrile (PAN), polymethyl methacrylate (PMMA), polyvinylidene fluoride (PVDF), polyvinylidene fluoride-hexafluoropropylene (PVDF-HFP), LiPON, $Li_3N$, $Li_xLa_{1-x}TiO_3$ (0<x<1) and $Li_2S$—GeS—$Ga_2S_3$, or a mixture of two or more types thereof, however, the lithium ion conducting polymer is not limited thereto, and polymers having lithium ion conductivity may be used without limit.

As for the formation of the protective film (55) using the lithium ion conducting polymer in the present invention, a coating solution obtained by dissolving or swelling the lithium ion conducting polymer in a solvent may be prepared and then coated on the negative electrode current collector (51).

At this time, the coating method may be selected from among known methods considering material properties and the like, or a proper new method may be used. For example, it is preferred that the polymer protective film composition is distributed on the current collector, and then uniformly dispersed using a doctor blade and the like. In some cases, a method of implementing distribution and dispersion in one process may also be used. In addition thereto, methods of dip coating, gravure coating, slit die coating, spin coating, comma coating, bar coating, reverse roll coating, screen coating, cap coating and the like may be used. At this time, the negative electrode current collector (51) is the same as described above.

After that, a drying process may be conducted for the protective film (55) formed on the negative electrode current collector (51), and at this time, the drying process may be conducted using a method of heating treatment, hot air drying or the like at a temperature of from 80° C. to 120° C. depending on the type of a solvent used in the lithium ion conducting polymer.

The solvent used herein preferably has a similar solubility index with the lithium ion conducting polymer, and has a low boiling point. This is due to the fact that the mixing may be uniform, and the solvent may be readily removed later on. Specifically, N,N'-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water, or a mixture thereof may be used as the solvent.

In order to further increasing lithium ion conductivity when using the lithium ion conducting polymer, materials used for this purpose may be further included.

As one example, a lithium salt such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, lithium tetraphenylborate or lithium imide may be further included.

The inorganic solid electrolyte is a ceramic-based material, and crystalline or non-crystalline materials may be used, and inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w is w<1) or $Li_{3.6}Si_{0.6}P_{0.4}O_4$ may be used. Herein, a lithium salt may be further included as necessary when using the inorganic solid electrolyte.

The inorganic solid electrolyte may be used in a thick film form through slurry coating after being mixed with known materials such as a binder. In addition, as necessary, a thin film form may be used through a deposition process such as sputtering. The slurry coating type used herein may be properly selected based on the coating method, the drying method and the solvent as described in the lithium ion conducting polymer.

The protective film (55) including the lithium ion conducting polymer and/or the inorganic solid electrolyte described above is capable of, while readily forming lithium metal (23) by increasing a lithium ion transfer rate, securing an effect of suppressing or preventing the generation of lithium dendrite generated when using the lithium metal (23)/negative electrode current collector (51) as a negative electrode.

In order to secure the above-described effect, the protective film (55) thickness needs to be limited.

The protective film (55) having a smaller thickness is advantageous for output characteristics of a battery, however, the protective film needs to be formed in a certain thickness or higher in order to suppress side reactions between lithium formed on the negative electrode current collector (51) later on and an electrolyte, and furthermore, dendrite growth may be effectively blocked. In the present invention, the protective film (55) preferably has a thickness of from 10 nm to 50 μm. When the protective film (55) thickness is less than the above-mentioned range, side reactions between lithium and an electrolyte increased under a condition of over-charge or high temperature storage may not be effectively suppressed failing to enhance safety, and when the thickness is greater than the above-mentioned range on the contrary, it takes a long time for the protective film (55) composition to be impregnated or swollen by an electrolyte liquid in the case of the lithium ion conducting polymer, and lithium ion migration decreases causing a concern of declining overall battery performance.

In the lithium secondary battery of another embodiment of the present invention, constitutions other than the protective film (55) follow the descriptions provided in the one embodiment.

In addition, the present invention provides a battery module including the lithium secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

EXAMPLE AND COMPARATIVE EXAMPLE

Example 1

$LiCoO_2$ (LCO) in N-methyl-2-pyrrolidone was used as a positive electrode active material, the positive electrode active material:conductive material (super-P):binder (PVdF) were mixed in a weight ratio of 95:2.5:2.5, and then L2N ($Li_2NiO_2$) was added thereto so that the weight ratio is 20% with respect to the LCO, and the result was mixed for 30 minutes using a paste face mixer to prepare a positive electrode slurry composition.

The slurry composition prepared above was dried on aluminum foil, a positive electrode current collector, having a thickness of 20 μm for 12 hours at 130° C. to prepare a positive electrode having a loading amount of 4 $mAh/cm^2$.

As a negative electrode, copper foil having a thickness of 100 μm was prepared as a negative electrode current collector.

Between the positive electrode and the negative electrode current collector prepared above, a polyethylene separator was provided to prepare an electrode assembly, and the electrode assembly was placed inside a case.

Subsequently, an electrolyte (100 μl) dissolving 1.0 M concentration of $LiPF_6$ as a lithium salt and 1% by weight of $LiN_3$ (oxidation potential with respect to lithium: 3.7 V) as a sacrificial salt in an organic solvent mixing ethylene carbonate:diethyl carbonate:dimethyl carbonate in a volume ratio of 1:2:1 was injected thereto to manufacture a negative electrode free lithium secondary battery.

Example 2

A negative electrode free lithium secondary battery was manufactured in the same manner as in Example 1 except that the $LiN_3$ content was changed to 5% by weight when preparing the electrolyte.

Example 3

A negative electrode free lithium secondary battery was manufactured in the same manner as in Example 1 except that the $LiN_3$ content was changed to 10% by weight when preparing the electrolyte.

Comparative Example 1

A negative electrode free lithium secondary battery was manufactured in the same manner as in Example 1 except that the sacrificial salt was not used when preparing the electrolyte.

Comparative Example 2

A negative electrode free lithium secondary battery was manufactured in the same manner as in Example 1 except that the $LiN_3$ content was changed to 35% by weight when preparing the electrolyte.

Comparative Example 3

A negative electrode free lithium secondary battery was manufactured in the same manner as in Example 1 except that 10% by weight of fluoroethylene carbonate (FEC) was used instead of the sacrificial salt when manufacturing the electrolyte.

Experimental Example 1. Evaluation on Performance of Lithium Secondary Battery

Each of the negative electrode free lithium secondary batteries manufactured in the examples and the comparative examples was charged once at 0.1 C and 4.25 V of CC/CV (5% current cut at 1 C) to manufacture a lithium metal-formed lithium secondary battery.

Each of the lithium secondary batteries was charged and discharged under a condition of 0.2 C charge and 0.5 C discharge using a charge and discharge measuring device (product of PNE SOLUTION Co., Ltd.), and the number of cycles when a capacity retention rate reached 80% with respect to initial discharge capacity was measured, and results obtained herein are shown in Table 2.

TABLE 2

|  | Use of Sacrificial Salt | Number of cycles when capacity retention rate was 80% with respect to initial capacity |
| --- | --- | --- |
| Example 1 | ◯ | 10 |
| Example 2 | ◯ | 20 |
| Example 3 | ◯ | 35 |
| Comparative Example 1 | X | 3 |
| Comparative Example 2 | ◯ | — |
| Comparative Example 3 | X | 8 |

When referring to Table 2, it was identified the negative electrode free lithium secondary batteries according to the examples had excellent capacity and lifetime properties compared to the negative electrode free lithium secondary batteries according to the comparative examples. Specifically, as shown in Table 2, it was identified that, in Examples 1 to 3 including a sacrificial salt in a certain content in the electrolyte, the number of cycles when the capacity retention rate was 80% with respect to initial discharge capacity was 10 cycles or higher, and the number of cycles increased as the content of the sacrificial salt increased. On the other hand, in Comparative Example 1 that did not include a sacrificial salt and Comparative Example 3 including an existing electrolyte additive, the number of cycles when the capacity retention rate was 80% with respect to initial discharge capacity was less than 10 cycles, and maintaining capacity retention was difficult since a decrease in the capacity was rapidly progressed resulting in inferior lifetime properties. In addition, in Comparative Example 2 including a sacrificial salt in an excess amount, the sacrificial salt was not completed dissolved in the electrolyte, and the number of cycles when the capacity retention rate was 80% with respect to initial discharge capacity was not able to be measured.

From such results, it was identified that the negative electrode free lithium secondary battery including a sacrificial salt according to the invention of the present application had an excellent capacity retention rate, and thereby had enhanced lifetime properties.

REFERENCE NUMERAL 10, 40: Positive Electrode
11, 41: Positive Electrode Current Collector
13, 43: Positive Electrode mixture
20, 50: Negative Electrode
21, 51: Negative Electrode Current Collector
23, 53: Lithium Metal
30, 60: Separator.

The invention claimed is:

1. A lithium secondary battery comprising:
a positive electrode;
a negative electrode comprising a negative electrode current collector; and
an electrolyte interposed between the positive electrode and negative electrode,
wherein lithium metal is formed on the negative electrode current collector by lithium ions migrating toward the negative electrode current collector after charge,
wherein the electrolyte comprises a sacrificial salt having an oxidation potential of 5 V or less with respect to lithium,
wherein the sacrificial salt comprises at least one selected from the group consisting of $LiC_2F_5CO_2$, LiTC, and LiBFB, and
wherein the sacrificial salt is present in an amount of from 1% by weight to 10% by weight based on a total 100% by weight of the electrolyte.

2. The lithium secondary battery of claim 1, wherein the oxidation potential of the sacrificial salt is in a range of from 3 V to 4.8 V with respect to lithium.

3. The lithium secondary battery of claim 1, wherein the sacrificial salt has an irreversible capacity of from 100 mAh/g to 600 mAh/g.

4. The lithium secondary battery of claim 1, wherein the electrolyte further comprises a lithium salt and an organic solvent.

5. The lithium secondary battery of claim 4, wherein the lithium salt comprises at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$ and $(CF_3SO_2)_3CLi$.

6. The lithium secondary battery of claim 1, wherein the lithium ion is derived from the positive electrode or the electrolyte.

7. The lithium secondary battery of claim 1, wherein the lithium metal is formed after a first charge in a voltage range of from 4.8 V to 2.5 V.

8. The lithium secondary battery of claim 1, wherein the positive electrode comprises at least one of positive electrode active materials selected from the group consisting of $LiCoO_2$, $LiNiO_2$, $LiMnO_2$, $LiMn_2O_4$, $Li(Ni_aCo_bMn_c)O_2$, wherein $0<a<1$, $0<b<1$, $0<c<1$, and $a+b+c=1$, $LiNi_{1-Y}Co_YO_2$, $LiCo_{1-Y}Mn_YO_2$, $LiNi_{1-Y}Mn_YO_2$, wherein $0\le Y<1$, $Li(Ni_aCo_bMn_c)O_4$, wherein $0<a<2$, $0<b<2$, $0<c<2$, and $a+b+c=2$, $LiMn_{2-z}Ni_zO_4$, $LiMn_{2-z}Co_zO_4$, wherein $0<Z<2$, $Li_xM_yMn_{2-y}O_{4-z}A_z$, wherein $0.9\le x\le 1.2$, $0<y<2$, $0\le z<0.2$, M=one or more of Al, Mg, Ni, Co, Fe, Cr, V, Ti, Cu, B, Ca, Zn, Zr, Nb, Mo, Sr, Sb, W, Ti and Bi, and A is one or more anions of −1 or −2 valency, $Li_{1+a}Ni_bM'_{1-b}O_{2-c}A'_c$, wherein $0\le a\le 0.1$, $0\le b\ge 0.8$, $0\le c<0.2$, M' is one or more types selected from the group consisting of octahedral stable elements such as Mn, Co, Mg or Al, A' is one or more anions of −1 or −2 valency, $LiCoPO_4$ and $LiFePO_4$.

9. The lithium secondary battery of claim 1, wherein the positive electrode further comprises a lithium metal compound represented by any one of the following Chemical Formulae 1 to 8:

$$Li_2Ni_{1-a}M^1_aO_2 \quad \text{[Chemical Formula 1]}$$

in the formula, $0\le a<1$, and $M^1$ is an element of at least one selected from the group consisting of Mn, Fe, Co, Cu, Zn, Mg and Cd, $$Li_{2+b}Ni_{1-c}M^2_cO_{2+d} \quad \text{[Chemical Formula 2]}$$

in the formula, $-0.5\le b\le 0.5$, $0\le c\le 1$, $0\le d<0.3$, and $M^2$ is an element of at least one selected from the group consisting of P, B, C, Al, Sc, Sr, Ti, V, Zr, Mn, Fe, Co, Cu, Zn, Cr, Mg, Nb, Mo and Cd, $$LiM^3_eMn_{1-e}O_2 \quad \text{[Chemical Formula 3]}$$

in the formula, $0\le e<0.5$, and $M^3$ is an element of at least one selected from the group consisting of Cr, Al, Ni, Mn and Co, $$Li_2M^4O_2 \quad \text{[Chemical Formula 4]}$$

in the formula, $M^4$ is an element of at least one selected from the group consisting of Cu and Ni, $$Li_{3+f}Nb_{1-g}M^5_gS_{4-h} \quad \text{[Chemical Formula 5]}$$

in the formula, $-0.1\le f\le 1$, $0\le g\le 0.5$, $-0.1\le h\le 0.5$, and $M^5$ is an element of at least one selected from the group consisting of Mn, Fe, Co, Cu, Zn, Mg and Cd, $$LiM^6_iMn_{1-i}O_2 \quad \text{[Chemical Formula 6]}$$

in the formula, $0.05\le i<0.5$, and $M^6$ is an element of at least one selected from the group consisting of Cr, Al, Ni, Mn and Co, $$LiM^7_{2j}Mn_{2-2j}O_4 \quad \text{[Chemical Formula 7]}$$

in the formula, $0.05\le j<0.5$, and $M^7$ is an element of at least one selected from the group consisting of Cr, Al, Ni, Mn and Co, and $$Li_kM^8_mN_n \quad \text{[Chemical Formula 8]}$$

in the formula, $M^8$ represents an alkaline-earth metal, $k/(k+m+n)$ is from 0.10 to 0.40, $m/(k+m+n)$ is from 0.20 to 0.50, and $n/(k+m+n)$ is from 0.20 to 0.50.

10. The lithium secondary battery of claim 1, wherein the negative electrode further comprises a protective film on a surface in contact with a separator.

11. The lithium secondary battery of claim 10, wherein the protective film comprises at least one selected from the group consisting of a lithium ion conducting polymer and an inorganic solid electrolyte.

12. The lithium secondary battery of claim 11, wherein the lithium ion conducting polymer comprises at least one selected from the group consisting of polyethylene oxide, polyacrylonitrile, polymethyl methacrylate, polyvinylidene fluoride and polyvinylidene fluoride-hexafluoropropylene.

13. The lithium secondary battery of claim 11, wherein the inorganic solid electrolyte comprises at least one selected form the group consisting of thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$, wherein w is w<1 and $Li_{3.6}Si_{0.6}P_{0.4}O_4$.

14. The lithium secondary battery of claim 10, wherein the protective film has a thickness of from 10 nm to 50 µm.

15. The lithium secondary battery of claim 1, wherein the sacrificial salt is present in an amount of from more than 2% by weight to 10% by weight based on the total 100% by weight of the electrolyte.

16. The lithium secondary battery of claim 1, wherein the sacrificial salt is present in an amount of from 5% by weight to 10% by weight based on the total 100% by weight of the electrolyte.

* * * * *